(12) United States Patent
Kitatomi et al.

(10) Patent No.: US 11,857,943 B2
(45) Date of Patent: Jan. 2, 2024

(54) ACTIVATED CARBON AND PRODUCTION METHOD THEREOF

(71) Applicant: KURARAY CO., LTD., Okayama (JP)

(72) Inventors: Hiroaki Kitatomi, Okayama (JP); Mitsunori Nishita, Okayama (JP); Mitsunori Hitomi, Okayama (JP); Takayuki Yamada, Okayama (JP)

(73) Assignee: KURARAY CO., LTD., Okayama (JP)

( * ) Notice: Subject to any disclaimer, the term of this patent is extended or adjusted under 35 U.S.C. 154(b) by 700 days.

(21) Appl. No.: 16/955,814

(22) PCT Filed: Dec. 14, 2018

(86) PCT No.: PCT/JP2018/046066
§ 371 (c)(1),
(2) Date: Jun. 19, 2020

(87) PCT Pub. No.: WO2019/131208
PCT Pub. Date: Jul. 4, 2019

(65) Prior Publication Data
US 2020/0338527 A1    Oct. 29, 2020

(30) Foreign Application Priority Data
Dec. 27, 2017    (JP) ................. 2017-252394

(51) Int. Cl.
| | |
|---|---|
| *C01B 32/318* | (2017.01) |
| *B01J 20/20* | (2006.01) |
| *C01B 32/348* | (2017.01) |
| *B01D 15/00* | (2006.01) |
| *B01J 20/28* | (2006.01) |
| *B01J 20/30* | (2006.01) |
| *C02F 1/28* | (2023.01) |
| *C02F 101/30* | (2006.01) |

(52) U.S. Cl.
CPC .............. *B01J 20/20* (2013.01); *B01D 15/00* (2013.01); *B01J 20/28076* (2013.01); *B01J 20/28085* (2013.01); *B01J 20/3078* (2013.01); *C01B 32/318* (2017.08); *C01B 32/348* (2017.08); *C02F 1/283* (2013.01); *C01P 2006/14* (2013.01); *C01P 2006/16* (2013.01); *C01P 2006/22* (2013.01); *C01P 2006/90* (2013.01); *C02F 2101/308* (2013.01)

(58) Field of Classification Search
CPC ........................................ C01B 32/30
See application file for complete search history.

(56) References Cited

U.S. PATENT DOCUMENTS

| | | | | |
|---|---|---|---|---|
| 3,539,467 | A | * | 11/1970 | Blaine .................. C01B 32/384 502/433 |
| 2007/0270307 | A1 | | 11/2007 | Hamasaki et al. |
| 2010/0069507 | A1 | * | 3/2010 | Tabata ................. C01B 32/318 502/437 |
| 2015/0375197 | A1 | | 12/2015 | Yanagi et al. |
| 2017/0209848 | A1 | | 7/2017 | Takenaka et al. |
| 2019/0022624 | A1 | | 1/2019 | Yamanol et al. |

FOREIGN PATENT DOCUMENTS

| | | |
|---|---|---|
| EP | 2960206 A1 | 12/2015 |
| JP | 2001226110 A | 8/2001 |
| JP | 2006015334 A | 1/2006 |
| JP | 2006104002 A | 4/2006 |
| JP | 2010520806 A | 6/2010 |
| JP | 2016030697 A | 3/2016 |
| JP | 2017171538 A | 9/2017 |
| WO | WO-2008110233 A1 | 9/2008 |
| WO | WO-2017146044 A1 | 8/2017 |

OTHER PUBLICATIONS

English translation of the International Preliminary Report on Patentability and Written Opinion dated Jul. 9, 2020 in PCT/JP2018/04066, 7 pages.
International Search Report dated Mar. 5, 2019 in PCT/JP2018/046066, 2 pages.
Extended European Search Report dated Jun. 1, 2021 in Patent Application No. 18897825.8, 8 pages.

* cited by examiner

*Primary Examiner* — Stuart L Hendrickson
(74) *Attorney, Agent, or Firm* — Element IP, PLC

(57) ABSTRACT

Disclosed herein are activated carbons having high decolorization performance in liquid phases, especially in liquid phases having relatively high viscosities, such as sugar liquids, and methods for producing the activated carbons. Activated carbons disclosed herein include activated carbons having a pore volume at a pore diameter of 10 to 10000 nm measured by the mercury intrusion method of 0.8 to 1.9 mL/g, and having a pore volume at a pore diameter of 300 to 1000 nm measured by the mercury intrusion method of 0.19 mL/g or more.

10 Claims, No Drawings

ACTIVATED CARBON AND PRODUCTION METHOD THEREOF

TECHNICAL FIELD

The present invention relates to activated carbon and a method for producing the same.

BACKGROUND ART

Activated carbon has an excellent adsorption ability, and is widely used in a liquid phase treatment such as a removal of impurities from a liquid phase or an adjustment of a concentration of a dissolved component in a liquid phase.

An adsorption ability of activated carbon in a liquid phase treatment extensively depends on whether the properties of the used activated carbon itself such as a pore volume and a pore distribution adapt to the properties of an adsorptive substance to be treated.

For example, D1 discloses activated carbon for decolorization which has developed pores at macropore ranges of 200 to 1000 nm and 600 to 1000 nm, and discloses that this activated carbon is produced by mixing and grounding two kinds of coal-based carbonaceous materials, pressure-forming the obtained mixture powder, crushing the pressure-formed product, subjecting the crushed product to a heating treatment, and then, activating the treated product.

In addition, D2 discloses activated carbon for a water treatment or a medical use having an adjusted pore volume at a pore diameter of 0.02 to 10 μm, and discloses that this activated carbon is produced by using a phenol resin as a raw material, carbonizing the phenol resin under the specified temperature condition, and activating the carbonized product.

PRIOR ART DOCUMENTS

Patent Documents

Patent Document 1: JP-A-2006-104002
Patent Document 2: JP-A-2006-15334

SUMMARY OF THE INVENTION

Problems to be Solved by the Invention

However, regarding the activated carbon obtained in Patent Document 1, higher performances (for example, a higher sugar liquid decolorization performance, and the like) may be required from a viewpoint of a practical use. In addition, regarding the activated carbon obtained in Patent Document 2, Patent Document 2 discloses only that it is excellent in a DL-β-aminoisobutyric acid adsorption rate and a decolorization performance of methylene blue, and does not disclose any decolorization performance of a liquid phase having a relatively high viscosity, such as a sugar liquid.

The present invention was performed in view of the above circumstances, and a problem of the present invention is to provide activated carbon having a high decolorization performance in a liquid phase, especially even in a liquid phase having a relatively high viscosity, such as a sugar liquid, and a method for producing the same.

Solutions to the Problems

The present inventors have found importance of developing the specified pore volumes of the pores including mesopores to macropores for an improved decolorization performance of the activated carbon, and arrived at the present invention, as a result of intensive studies to solve the above problem.

The present invention includes the following preferred embodiments.

[1] Activated carbon, wherein the activated carbon has a pore volume at a pore diameter of 10 to 10000 nm measured by the mercury intrusion method of 0.8 to 1.9 mL/g, and a pore volume at a pore diameter of 300 to 1000 nm measured by the mercury intrusion method of 0.19 mL/g or more.

[2] The activated carbon according to the above [1], wherein a raw material of the said activated carbon is activated carbon derived from coconut shell.

[3] The activated carbon according to the above [1] or [2], wherein the said activated carbon is activated carbon for a liquid phase treatment.

[4] The activated carbon according to the above [3], wherein the said liquid phase treatment is a treatment for removing a coloring component from a liquid phase.

[5] The activated carbon according to the above [3] or [4], wherein a viscosity of a liquid phase measured at a temperature during the liquid phase treatment by use of DV-I+ VISCOMETER manufactured by BROOKFIELD (spindle: LV-1, rotational speed: 20 rpm) is 1 to 50 mPa·s.

[6] The activated carbon according to any one of the above [1] to [5], wherein the said activated carbon has micro-strength hardness of 45% or more.

[7] A method for producing the activated carbon according to any one of the above [1] to [6], comprising: a step of adjusting a potassium element content of raw material activated carbon to 0.5% by mass or less, a step of adjusting a calcium element content of raw material activated carbon to 0.4 to 4% by mass, and a step of activating the raw material activated carbon after the adjustment steps.

Effects of the Invention

According to the present invention, activated carbon having a high decolorization performance in a liquid phase, especially in a liquid phase having a relatively high viscosity, such as a sugar liquid, and a method for producing the same can be provided.

EMBODIMENTS OF THE INVENTION

Hereinafter, embodiments of the present invention are explained. However, the scope of the present invention are not limited to the embodiments explained below, and various modifications can be made within a range that does not impair the purpose of the present invention.

[Activated Carbon]

The activated carbon of the present invention has a pore volume at a pore diameter of 10 to 10000 nm measured by the mercury intrusion method of 0.8 to 1.9 mL/g, and a pore volume at a pore diameter of 300 to 1000 nm measured by the mercury intrusion method of 0.19 mL/g or more.

The pore at a pore diameter of 10 to 10000 nm serves not only as an adsorbed site, but also as a moving path of a substance to a smaller pore. Therefore, when the pore volume at a pore diameter of 10 to 10000 nm is less than 0.8 mL/g, a movement of an adsorptive substance into the activated carbon inside is prevented, and thus, the desired adsorption performance (for example, the decolorization performance, the equilibrium adsorption amount or the decolorization equilibrium arrival rate) cannot be obtained. In contrast, when the pore volume at a pore diameter of 10 to 10000 nm is more than 1.9 mL/g, a packing density decreases, and the desired adsorption performance cannot be obtained in a case where such activated carbon is packed in an adsorption column or an adsorption tower to be used. In addition, the desired hardness cannot be obtained.

The pore volume at a pore diameter of 10 to 10000 nm of the activated carbon of the present invention measured by the mercury intrusion method is preferably 0.9 to 1.7 mL/g, more preferably 1.0 to 1.6 mL/g, especially preferably 1.3 to 1.5 mL/g. When the said pore volume is within the above range, the desired adsorption performance can be obtained more readily and the desired hardness can be obtained more readily.

The pore having a pore diameter of 300 to 1000 nm serves as an adsorbed site. In addition, when the pore volume at this pore diameter is large, an adsorptive substance easily diffuses. Therefore, when the pore volume at a pore diameter of 300 to 1000 nm is less than 0.19 mL/g, the desired decolorization performance (in particular, the sugar liquid decolorization performance and the decolorization equilibrium arrival rate) cannot be obtained. The upper limit of the pore volume at a pore diameter of 300 to 1000 nm is not especially limited, but is preferably 0.40 mL/g or less, more preferably 0.38 mL/g or less, further preferably 0.37 mL/g or less since a decrease of an adsorption performance due to a decrease of a packing density and a decrease of hardness (JIS hardness and MS hardness, in particular MS hardness) are concerns.

The pore volume at a pore diameter of 300 to 1000 nm of the activated carbon of the present invention measured by the mercury intrusion method is preferably 0.20 mL/g or more, more preferably 0.23 mL/g or more, further preferably 0.25 mL/g or more, especially preferably 0.30 mL/g or more. When the said pore volume is within the above range, the activated carbon having a combination of the desired adsorption performance and the desired hardness can be obtained more readily.

The specified pore volumes at the specified pore diameters mentioned above can be adjusted by adjusting a potassium element content of raw material activated carbon to 0.5% by mass or less, adjusting a calcium element content of raw material activated carbon to 0.4 to 4 by mass or less, and activating the raw material activated carbon after the adjustments, as described later. An activation yield should be appropriately selected so as to obtain the specified pore volumes at the specified pore diameters.

Hardness of the activated carbon of the present invention measured according to JIS K1474 (hereinafter, it is also referred to as "JIS hardness") is preferably 70% or more, more preferably 72% or more. When the activated carbon has JIS hardness of the above value or more, a trouble, which is caused by dusts produced from the activated carbon when using the activated carbon for a liquid phase treatment, can be prevented more readily.

Micro-strength hardness (hereinafter, it is also referred to as "MS hardness") of the activated carbon of the present invention is preferably 45% or more, more preferably 50% or more. The MS hardness is an index of resistance to weight load, and can be measured by the method described in the Examples mentioned below. When the activated carbon has MS hardness of the above value or more, dust production due to the self-weight of the activated carbon when packing the activated carbon in an adsorption column or an adsorption tower to be used can be reduced more readily.

These specified hardness can be adjusted by adjusting a potassium element content of raw material activated carbon to 0.5% by mass or less, adjusting a calcium element content of raw material activated carbon to 0.4 to 4 by mass or less, and activating the raw material activated carbon after the adjustments while adjusting an activation yield appropriately, as described later. When the pore volume at a pore diameter of 10 to 10000 nm, and especially the pore volume at a pore diameter of 300 to 1000 nm are too large, the hardness (the JIS hardness and the MS hardness, especially the MS hardness) tends to decrease. Therefore, it is important to adjust the pore volumes at the specified pore diameters in order to achieve a good balance between the hardness and the adsorption performance.

The activated carbon of the present invention is useful for a liquid phase treatment, since it has the specified pore volumes at the specified pore diameters. Therefore, in one embodiment of the present invention, the activated carbon of the present invention is activated carbon for a liquid phase treatment. In addition, the activated carbon of the present invention is useful for a liquid phase treatment with an adsorption column, an adsorption tower or the like, since it has the high MS hardness. In the present invention, the liquid phase may be any liquid phase as long as it exists as a liquid phase under normal processing conditions. Examples of the liquid phase include a solution, a dispersion, an emulsion, a microemulsion, a suspension, an oil and an alcohol.

Examples of the liquid phase treatment include a removal treatment of impurities from a liquid phase and an adjustment of a concentration of a dissolved component in a liquid phase. In one embodiment of the present invention, the above liquid phase treatment is a removal treatment (decolorization treatment) of a coloring component from a liquid phase.

A treatment of a liquid phase having a relatively high viscosity in addition to a treatment of a liquid phase having a low viscosity can be performed by use of the activated carbon of the present invention. Therefore, in one embodiment of the present invention, a viscosity of a liquid phase measured at a temperature during the liquid phase treatment by use of DV-I+VISCOMETER manufactured by BROOKFIELD (spindle: LV-1, rotational speed: 20 rpm) is 1 to 50 mPa·s. The liquid phases having such a viscosity may include but are not limited to a sugar liquid, soy sauce and glycerin. The temperature during the liquid phase treatment differs depending on the objective liquid phase. Usually, for example, when the liquid phase is a sugar liquid, the temperature is about 40 to 60° C., when the liquid phase is soy sauce, the temperature is about 15 to 35° C., and the liquid phase is glycerin, the temperature is about 70° C. As to a liquid phase used for evaluating a colorant adsorption amount of activated carbon (for example, an aqueous solution of the dye of Solophenyl RED 3BL (hereinafter, it is also referred to as "SPR") in an evaluation with SPR, described later), a temperature during the liquid phase treatment is usually a normal temperature (25° C.).

A decolorization performance of the activated carbon of the present invention can be evaluated, for example, by use of a sugar liquid or soy sauce by the method described in the Examples mentioned below. The sugar liquid decolorization performance is especially preferably 40% or more, more especially preferably more than 50%. The soy sauce decolorization performance is more preferably 80% or more, especially preferably more than 90%. These decolorization performances can be obtained by adjusting the pore volume at a pore diameter of 10 to 10000 nm and the pore volume at a pore diameter of 300 to 1000 nm to the specified range and the specified value or more, respectively.

A colorant adsorption amount of the activated carbon of the present invention can be evaluated, for example, by obtaining an equilibrium adsorption amount and a decolorization equilibrium arrival rate by use of SPR by the method described in the Examples mentioned below. The SPR equilibrium adsorption amount is preferably 90 mg/g or more, more preferably 94 mg/g or more, especially preferably 98 mg/g or more, and the SPR decolorization equilibrium arrival rate is preferably 50% or more, more preferably 55% or more, especially preferably 58% or more. The above equilibrium adsorption amount and decolorization equilibrium arrival rate can be obtained by adjusting the pore volume at a pore diameter of 10 to 10000 nm and the pore volume at a pore diameter of 300 to 1000 nm to the specified range and the specified value or more, respectively. The activated carbon of the present invention is useful for a liquid phase treatment by use of an adsorption column, an adsorption tower or the like, since it can rapidly and efficiently adsorb and remove impurities such as a colorant.

The activated carbon used for the liquid phase treatment and thus having the decreased adsorption performance (decolorization performance) can be recycled by the predetermined treatment and can be reused.

[Method for Producing Activated Carbon]

The activated carbon of the present invention can be obtained by a production method comprising:
a step of reducing a potassium element contained in raw material activated carbon (hereinafter, it is also referred to as "a potassium reduction step"),
a step of bringing raw material activated carbon into contact with a calcium element supply source (hereinafter, it is also referred to as "a calcium contact step"),
a step of activating the raw material activated carbon after adjusting a potassium element content and a calcium element content (hereinafter, it is also referred to as "a second activation step"), and
a step of acid-washing the raw material activated carbon after the activation (hereinafter, it is also referred to as "an acid-washing step").

In the present specification, "activated carbon" means activated carbon obtained via the four steps in the above production method, and "raw material activated carbon" means activated carbon obtained by performing an activation treatment (a first activation treatment) of an activated carbon precursor, which is raw material activated carbon for the activated carbon of the present invention and is activated carbon that has not gone through all four of the above steps (that is to say, that is in the middle of the above production process).

The activated carbon of the present invention can be produced, for example, by a production method comprising:
a step of adjusting a potassium element content of raw material activated carbon to 0.5% by mass or less,
a step of adjusting a calcium element content of raw material activated carbon to 0.4 to 4% by mass, and
a step of activating the raw material activated carbon after the adjustment steps.

Therefore, one embodiment of the present invention relates to activated carbon produced by the production method comprising:
a step of adjusting a potassium element content of raw material activated carbon to 0.5% by mass or less,
a step of adjusting a calcium element content of raw material activated carbon to 0.4 to 4% by mass, and
a step of activating the raw material activated carbon after the adjustment steps.

The raw material activated carbon is preferably activated carbon derived from coconut shell. Therefore, in a preferable embodiment of the present invention, a raw material of the activated carbon of the present invention is activated carbon derived from coconut shell.

When the raw material activated carbon is derived from coconut shell, each of raw material activated carbon particles has tissue pores inherent in the coconut shell. Therefore, the calcium element supply source can diffuse more readily inside of the particles, and pore development can proceed more readily at the time of the activation step. In addition, coconut shell is commercially advantageous, since it is available in large amounts.

Palms for a raw material of the coconut shell are not particularly limited. Examples thereof include palm (oil palm), coconut palm, salak and double coconut and the like. The coconut shell obtained from these palms may be used alone or in combination of two or more. Among them, the coconut shell derived from coconut palm or derived from oil palm which is a biomass waste generated in large amounts as a result of using the palms as foods, detergent raw materials, biodiesel oil raw materials and the like is particularly preferable, since it is readily available and inexpensive.

It is also possible to obtain the coconut shell in the form of char prepared by pre-calcining coconut shell (coconut shell char), and it is preferable to use it as the raw material. In addition, char may be prepared from coconut shell, and the prepared char may be used. The method for preparing the char is not particularly limited, and any method well-known in the art may be used. For example, the coconut shell char can be prepared by calcining (carbonizing) coconut shell as a raw material at a temperature of about 400 to 800° C. under an atmosphere of an inert gas such as nitrogen, helium, argon or carbon monoxide, a mixed gas of these inert gases, or a mixed gas with another gas containing at least one of these inert gases as a main component.

The raw material activated carbon used in the present invention can be obtained, for example, by the activation treatment (the first activation treatment) of the said activated carbon precursor (coconut shell char). The activation treatment is a treatment of forming pores on the surface of the activated carbon precursor and modifying the activated carbon precursor to a porous carbonaceous material. This treatment can provide the activated carbon (the raw material activated carbon) having a large specific surface area and a large pore volume. In a case where the first activation treatment is not performed and the activated carbon precursor is used as the raw material activated carbon, the specific surface area and pore volumes of the obtained carbonaceous material are not sufficient. Thus, when such a carbonaceous material is used for the liquid phase treatment, it is difficult to achieve a sufficient effect in the liquid phase treatment such as the removal treatment of impurities from the liquid phase and the adjustment of a concentration of the dissolved component in the liquid phase. Therefore, in such a case, the activated carbon of the present invention cannot be obtained.

The first activation treatment can be performed by treating the activated carbon precursor at 800° C. or more, preferably 800 to 1000° C., under a mixed gas atmosphere of water vapor, nitrogen and carbon dioxide by use of a fluidized bed, a multi-stage furnace or a rotary furnace.

The gas partial pressure at the time is not especially limited, but is preferably a water vapor partial pressure of 7.5 to 40%, a carbon dioxide partial pressure of 10 to 50%, and a nitrogen partial pressure of 30 to 80%. The gas total pressure is usually 1 atm (about 0.1 MPa).

A total supplied amount of the mixed gas during the first activation treatment is around 1 to 50 L/minute relative to 100 g of a material to be activated. When the total supplied amount of the activation gas is within the above range, it is easy to make the activation reaction proceed more efficiently.

The specific surface area of the raw material activated carbon in the present invention which is calculated by the BET method (hereinafter, it is also referred to as "a BET specific surface area") is preferably 900 $m^2$/g to 1500 $m^2$/g. When the BET specific surface area of the raw material activated carbon is within the above range, activated carbon having sufficient physical properties for the liquid phase treatment applications can be obtained more readily.

<Potassium Reduction Step>

In the production method of the present invention, the potassium element in the raw material activated carbon is reduced to 0.5% by mass or less. The reason is that, when the potassium element exists in large amounts, development of volume of micropores is accelerated ahead of that of volumes of mesopores to macropores suitable for the liquid phase treatment in the second activation step after the contact step of the calcium element supply source. Therefore, when the potassium element in the raw material activated carbon exceeds 0.5% by mass, the specified pore volumes of the specified pore diameters cannot be obtained in the activated carbon of the present invention. The potassium element content of the raw material activated carbon is preferably 0.3% by mass or less. When the potassium element content is the above value or less, the desired pore volumes can be obtained more readily. The potassium element content can be measured by the method described in the Examples mentioned below. The lower limit of the potassium element content is 0.0% by mass, which is the detection limit of the measuring method.

The method for reducing the potassium element is not particularly limited, and examples thereof include washing with a washing liquid containing an acid, exchanging a potassium component for another component (for example, a calcium component) by an ion-exchanging action, and the like.

<Calcium Contact Step>

The raw material activated carbon having the potassium element content reduced by the above potassium reduction step is contacted with the calcium element supply source. By this step, the calcium element supply source adheres on the surface of the raw material activated carbon and in the pores of the raw material activated carbon. The calcium element content contained in the raw material activated carbon after the contact step is 0.4 to 4% by mass. When the calcium element content is not within the above range, the specified pore volumes of the specified pore diameters cannot be obtained in the activated carbon of the present invention even when the following second activation step and acid treatment step are performed. The calcium element content contained in the raw material activated carbon after the contact step is preferably 0.5 to 3% by mass. When the calcium element content is within the above range, the desired pore volumes can be obtained more readily. The calcium element content can be measured by the method described in the Examples mentioned below.

The calcium element supply source is not particularly limited, and a water-insoluble calcium compound or a water-soluble calcium compound can be used as the calcium element supply source. The calcium compounds may be used alone or in combination of two or more.

Examples of the water-insoluble calcium compound include calcium carbonate and calcium hydroxide. From a viewpoint of a handling safety, calcium carbonate is preferably used.

From a viewpoint of being able to contact the calcium element supply source in the form of an aqueous solution and thus easily adhering the calcium element supply source uniformly, the water-soluble calcium compound is preferably used. Concrete examples of the water-soluble calcium compound include calcium chloride, calcium nitrate, calcium acetate and the like. Among them, calcium nitrate is preferable, since it is highly soluble, readily available and inexpensive. From a view point of low environmental impact in view of a waste liquid treatment, calcium chloride or calcium acetate is preferably used.

The method for contacting the calcium element supply source may be any method as long as the calcium element supply source can adhere to the raw material activated carbon. Examples thereof include, for example, a method in which an aqueous solution of the calcium element supply source is sprayed to the raw material activated carbon, a method in which the raw material activated carbon is immersed in a solution of the calcium element supply source, and a method in which the raw material activated carbon and the powdery calcium element supply source are mixed. Among them, the method in which the calcium element supply source in the form of the aqueous solution is contacted with the raw material activated carbon, such as the spraying method or the immersing method, is preferable, since the calcium element supply source can adhere more readily on the surface of the raw material activated carbon and in the pores of the raw material activated carbon uniformly.

In the immersing method which is one of the calcium contact methods, the potassium component in the raw material activated carbon can be exchanged for the calcium component by the ion-exchanging action and discharged into the aqueous solution, and thus, the two steps of the potassium reduction step and the calcium contact step can be simultaneously performed.

When the calcium element supply source is used in the form of an aqueous solution in the calcium contact step, the raw material activated carbon after contacting with the calcium element supply source is usually dried before the second activation step, but may be subjected to the second activation treatment without drying after adequately removing liquid from the raw material activated carbon.

<Second Activation Step>

The raw material activated carbon after subjecting to the potassium reduction step and the calcium contact step is subjected to the second activation treatment. This second activation treatment is performed in the same manner as in the first activation treatment except that the material to be activated is the activated carbon to which calcium is attached.

<Acid-Washing Step>

The raw material activated carbon after the second activation step is washed with the washing liquid containing an acid, and thereby impurities such as metal components contained in the raw material activated carbon are removed. The acid-washing can be performed, for example, by immersing the raw material activated carbon after the second activation step in the washing liquid containing an acid. In the acid-washing step, the raw material activated carbon may be washed with water after acid-washing, or the acid-washing and the water-washing may be appropriately combined, for example, by repeating the acid-washing and the water-washing. In addition, the acid component may be removed by heating.

As the acid contained in the washing liquid, inorganic acids such as hydrochloric acid, sulfuric acid and nitric acid, or organic acids such as saturated carboxylic acids such as formic acid, acetic acid, propionic acid, oxalic acid, tartaric acid and citric acid or aromatic carboxylic acids such as benzoic acid and terephthalic acid are preferably used. Among them, hydrochloric acid which does not oxidize the raw material activated carbon is more preferably used. When hydrochloric acid is used as the washing liquid containing an acid, a concentration of hydrochloric acid is preferably 0.1 to 10% by mass, more preferably 0.3 to 6% by mass. When the concentration of hydrochloric acid is too low, it is necessary to increase the number of times of acid-washing to remove the impurities. In contrast, when the concentration of hydrochloric acid is too high, residual amount of hydrochloric acid becomes high. Thus, when the concentration is within the above range, the acid-washing step can be efficiently performed, which is preferable in view of productivity.

The liquid temperature during the acid-washing step or water-washing step is not particularly limited, but is preferably 0 to 100° C., more preferably 10 to 100° C., further preferably 15 to 95° C. When the temperature of the washing liquid during immersing the raw material activated carbon in the washing liquid is within the above range, it is preferable since washing can be performed in a practical time while suppressing a load on the apparatus.

The activated carbon of the present invention can be obtained by drying the activated carbon after the acid-washing step. The method for drying is not particularly limited, and any well-known method for drying may be used. The drying may be performed by use of a natural convection constant-temperature dryer, a forced convection constant-temperature dryer, a vibration fluidized dryer or the like. The drying temperature is preferably 80 to 150° C. A weight loss of the activated carbon after drying is preferably 5% by mass or less.

The activated carbon of the present invention produced in this way has the specified developed pore volumes of the pores including mesopores to macropores. Therefore, the activated carbon of the present invention can exhibit the high performances (such as the removal performance of impurities, and the performance for adjusting a concentration of a dissolved component) in the liquid phase treatment, and, in particular, the improved and balanced decolorization performance in a liquid phase having a relatively high viscosity, such as a sugar liquid, in addition to a liquid phase having a low viscosity.

EXAMPLES

Hereinafter, the present invention will be explained in more detail by the Examples. However, the Examples are not intended to limit the scope of the present invention.

A BET specific surface area and a metal element content of the raw material activated carbon, and a pore volume, JIS hardness and MS hardness of the activated carbon were determined by the following methods.
<BET Specific Surface Area of Raw Material Activated Carbon>

A BET specific surface area of the raw material activated carbon was determined by the high precision surface area/pore distribution measurement device ("BELSORP 28 SA" manufactured by MicrotracBEL Corporation). After degassing the measurement sample at 300° C. for 5 hours under vacuum, a nitrogen adsorption isotherm at 77K was measured. Using the obtained adsorption isotherm, a multipoint analysis by the BET equation was performed. A specific surface area was calculated from a straight line in the range of a relative pressure P/P0 of 0.01 to 0.1 of the obtained curve.
<Average Particle Diameter>

When a metal element content of the raw material activated carbon and a decolorization performance of the activated carbon are evaluated, the raw material activated carbon or the activated carbon needs to be ground to have a predetermined average particle diameter. Therefore, an average particle diameter of the raw material activated carbon or the activated carbon after grinding was measured by the laser diffraction measurement method in order to confirm whether the raw material activated carbon or the activated carbon has the predetermined average particle diameter.

Specifically, the powdery raw material activated carbon or the powdery activated carbon to be measured, the surfactant and ion-exchanged water were mixed to obtain a dispersion, and the average particle diameter in the dispersion was measured by the penetration method by use of the laser scattering•laser diffraction/scattering particle diameter distribution analyzer ("MT3000II" manufactured by Microtrac-BEL Corporation). A concentration of the powdery activated carbon in the dispersion was adjusted so as to be within the measurement concentration range of the analyzer. Polyoxyethylene (10) octylphenyl ether manufactured by Wako Pure Chemical Corporation was used as the surfactant during preparing the dispersion, and the surfactant was added in an appropriate amount that did not generate bubbles affecting the measurement. The analysis conditions are shown below.

Number of measurements: once
Measurement time: 30 seconds
Indication of distribution: volume
Particle diameter classification: standard
Calculation mode: MT3000II
Solvent name: WATER
Upper limit of measurement: 2000 μm
Lower limit of measurement: 0.021 μm
Residue ratio: 0.00
Passing material ratio: 0.00
Set of residue ratio: disablement
Permeability of particle: permeance
Refraction index of particle: 1.81
Shape of particle: non-spherical
Refraction index of solvent: 1.333
DV value: 0.0150 to 0.0700
Permeability rate (TR): 0.700 to 0.950

The D50 value was adopted as the average particle diameter in the measurement result.
<Metal Element Content of Raw Material Activated Carbon>

First, calibration curves relating to a potassium element content and a calcium element content were prepared by use of the standard solution with known concentrations.

Next, after the raw material activated carbon ground so as to have an average particle diameter of 20 μm or less was dried at 115±5° C. for 3 hours, 0.1 g of the raw material activated carbon was added to the specified container. To this container, 10 mL of nitric acid (60.0 to 62.0% by mass) was further added, and then, a pretreatment was performed at a temperature of 210° C. for 1 hour by use of the microwave sample pretreatment device ("MARS 6" manufactured by CEN Japan corporation) to decompose the raw material activated carbon.

The obtained solution was taken off, and ion-exchanged water was added to the obtained solution to prepare 200 mL of a measurement solution. The measurement solution was analyzed by use of the multi-type ICP emission analyzer ("ICPE-9820" manufactured by Shimadzu Corporation). A concentration of each of the metal elements was determined by use of the obtained values and the prepared calibration curves, and a potassium element content and a calcium element content were obtained by use of the following mathematical formula.

[Mathematical formula 1]

$$\text{Metal element content [\% by mass]} = \frac{\text{Metal element concentration [mg/L]} \times 10^{-3} \times 0.2[\text{L}]}{\text{Mass of raw material activated carbon [g]}} \times 100$$

<Pore Volume of Activated Carbon>

A pore volume per mass of the activated carbon was measured by use of the mercury intrusion method pore volume measurement device ("MicroActive AutoPore V 9600" manufactured by Micromeritics instrument corporation). A mercury pressure of 0.10 psia (about 0.69 kPa) to 61000.00 psia (about 420580.19 kPa) was adopted.

<JIS Hardness of Activated Carbon>

JIS hardness of the activated carbon was measured according to JIS K1474.

<MS Hardness of Activated Carbon>

To a steel pot with an inside diameter of 25.4 mm and a length of 304.8 mm, 10 of steel balls with a diameter of 8 mm were added, about 5.0 g (weighed to the order of 0.1 g) of the dried activated carbon was further added, and the steel pot was sealed. The steel pot was attached to a measuring device, and was rotated at a speed of 25 rotations per minute for 40 minutes. Then, the content was taken off, the steel balls were removed from the content, and sieving was performed by use of a 50 mesh sieve (JIS standard). A ratio (unit: %) of mass of the sample left on the sieve to mass of the sample originally added to the steel pot was calculated according to the following mathematical formula, which was adopted as MS hardness.

[Mathematical formula 2]

$$MS\ \text{hardness [\%]} = \frac{\text{Mass of sample left on sieve [g]}}{\text{Mass of sample weighted before measurement [g]}} \times 100$$

Example 1

(1) Preparation of Raw Material Activated Carbon

Char prepared from coconut shell of the Philippine-grown coconut (a specific surface area: 370 m²/g) was activated at 850° C. by use of propane combustion gas and water vapor (total water vapor partial pressure: 35%) in a rotary kiln, the obtained product was sized by use of a 10 to 30 mesh sieve (JIS standard), and raw material activated carbon having a specific surface area of 1141 m²/g was obtained.

(2) Preparation of Activated Carbon

The obtained raw material activated carbon (600 g) was added to 2120 mL of hydrochloric acid (0.3 N), washed by boiling for 20 minutes, sufficiently washed with ion-exchanged water so as to obtain a pH of 5 to 7, and dried in a natural convection constant-temperature dryer set at 115±5° C. for 4 hours. The potassium element content of the obtained raw material activated carbon after the acid-washing was 0.0% by mass. Next, an aqueous solution of calcium nitrate (23 g of calcium nitrate tetrahydrate, 117 g of ion-exchanged water) was sprayed to 500 g of the obtained activated carbon, and then, the sprayed activated carbon was dried in the natural convection constant-temperature dryer set at 115±5° C. for 5 to 7 hours. The calcium element content of the obtained activated carbon containing calcium element was 0.8% by mass. Subsequently, 450 g of the obtained activated carbon containing calcium element was put in a fluidized furnace, a mixed gas having a water vapor partial pressure of 16%, a carbon dioxide partial pressure of 12% and a nitrogen partial pressure of 72% was supplied to the fluidized furnace at a gas total pressure of 1 atm and a flow rate of 108.4 L/minute, and activation was performed under a condition of an activation temperature of 920° C. so as to obtain an activation yield of 18.5%. A packing density of the obtained activated product was measured according to JIS K1474, 1800 mL of hydrochloric acid (1 N) was added to 410 mL (in terms of volume) of the activated product, and the activated product was washed with heating for 1 hour, sufficiently washed with ion-exchanged water so as to obtain a pH of 5 to 7, and dried at 115±5° C. for 4 hours to obtain activated carbon. The physical properties of the obtained activated carbon are shown in Table 1.

Example 2

Activated carbon was obtained in the same manner as in Example 1 except that an activation yield was 33.0%. The physical properties of the obtained activated carbon were shown in Table 1.

Example 3

Activated carbon was obtained in the same manner as in Example 1 except that an activation yield was 39.5%. The physical properties of the obtained activated carbon were shown in Table 1.

Example 4

Raw material activated carbon (500 g) obtained in the same manner as in Example 1 was immersed in an aqueous solution of calcium nitrate (55.1 g of calcium nitrate tetrahydrate, 1125 g of ion-exchanged water), stirring was performed at a room temperature for 6 hours, filtering was performed, and then, drying was performed in a natural convection constant-temperature dryer set at 115±5° C. for 5 to 7 hours. The potassium element content and calcium element content of the obtained activated carbon containing calcium element were 0.4% by mass and 0.9% by mass, respectively. Activated carbon was obtained in the same manner as in Example 1 except that the activated carbon containing calcium element was activated so as to obtain an activation yield of 26.0%. The physical properties of the obtained activated carbon were shown in Table 1.

Example 5

Raw material activated carbon (500 g) obtained in the same manner as in Example 1 was immersed in an aqueous solution of calcium chloride (26.9 g of calcium chloride, 1125 g of ion-exchanged water), stirring was performed at a room temperature for 6 hours, filtering was performed, and then, drying was performed in a natural convection constant-temperature dryer set at 115±5° C. for 5 to 7 hours. The potassium element content and calcium element content of the obtained activated carbon containing calcium element were 0.3% by mass and 1.1% by mass, respectively. Activated carbon was obtained in the same manner as in Example 1 except that the activated carbon containing calcium element was activated so as to obtain an activation yield of 33.2%. The physical properties of the obtained activated carbon were shown in Table 1.

Example 6

Activated carbon was obtained in the same manner as in Example 1 except that an activation yield was 9.1%. The physical properties of the obtained activated carbon were shown in Table 1.

Example 7

Activated carbon was obtained in the same manner as in Example 1 except that an activation yield was 45.2%. The physical properties of the obtained activated carbon were shown in Table 1.

Comparative Example 1

Bituminous coal having a weak caking property and a button index of 1 measured according to the crucible expansion test method of JIS M 8801 6 and bituminous coal having a slightly caking property and a button index of 0.5 were mixed in a mass ratio of 3:7. Next, to 100 parts by mass of this obtained mixture, 20 parts by mass of a strongly caking coal having a button index of 9 was added, and mixing and grinding were performed by use of a ball mill. The obtained ground product was filled into a container with a diameter of 4 cm and a length of 15 cm by use of a pressure molding machine, and pressure molding was performed at 100° C. under a pressure of 280 kg/cm$^2$. The obtained pressure molded product was crushed with a jaw crusher and sized in a particle diameter of 0.1 to 2.0 mm. This sized product was put in an external heating type rotary kiln, and heated to 300° C. under an oxidizing gas atmosphere, and the temperature was maintained for 2 hours. Then, the obtained product was heated to 650° C. under a reducing gas atmosphere, and cooled to obtain a carbonized product. This carbonized product (75 g) was put in a fluidized furnace, a mixed gas having a water vapor partial pressure of 16%, a carbon dioxide partial pressure of 12% and a nitrogen partial pressure of 72% was supplied at a gas total pressure of 1 atm and a flow rate of 21.7 L/minute to the furnace, and activation was performed under a condition of an activation temperature of 950° C. so as to obtain an activation yield of 50.0%. As to the obtained activated product, a measurement of a packing density, acid-washing, water washing and drying were performed in the same manner as in Example 1 to obtain activated carbon. The physical properties of the obtained activated carbon were shown in Table 1.

Comparative Example 2

Activated carbon was obtained in the same manner as in Example 1 except that an activation yield was 81.9%. The physical properties of the obtained activated carbon were shown in Table 1.

Comparative Example 3

Activated carbon was obtained in the same manner as in Example 1 except that an activation yield was 59.5%. The physical properties of the obtained activated carbon were shown in Table 1.

Comparative Example 4

An aqueous solution of calcium nitrate (23 g of calcium nitrate tetrahydrate, 117 g of ion-exchanged water) was sprayed to raw material activated carbon and drying was performed in a natural convection constant-temperature dryer set at 115±5° C. for 5 to 7 hours, without performing the adjustment step of the potassium element content of the raw material activated carbon in Example 1. The potassium element content and the calcium element content of the obtained activated carbon containing calcium element were 0.7% by mass and 0.7% by mass, respectively. Activated carbon was obtained in the same manner as in Example 1 except that an activation yield was 80.4%. The physical properties of the obtained activated carbon were shown in Table 1.

Comparative Example 5

Activated carbon was obtained in the same manner as in Comparative example 4 except that an activation yield was 57.0%. The physical properties of the obtained activated carbon were shown in Table 1.

Comparative Example 6

Activated carbon was obtained in the same manner as in Comparative example 4 except that an activation yield was 36.8%. The physical properties of the obtained activated carbon were shown in Table 1.

Comparative Example 7

Activated carbon was obtained in the same manner as in Comparative example 4 except that an activation yield was 30.4%. The physical properties of the obtained activated carbon were shown in Table 1.

Comparative Example 8

Activated carbon was obtained in the same manner as in Comparative example 4 except that an activation yield was 18.2%. The physical properties of the obtained activated carbon were shown in Table 1.

Comparative Example 9

A temperature of 700 g of a phenol resin was maintained at 300° C. for 2 hours in an external heating type rotary kiln, and the obtained product was heated to 650° C., and then cooled to obtain a carbonized product. This carbonized product (180 g) was put in a rotary kiln set at a temperature of 900° C., and activation was performed at a nitrogen flow amount of 5 L/minute and a water vapor flow amount of 180 g/hour for 6 hours. The physical properties of the obtained activated carbon were shown in Table 1.

In order to evaluate decolorization performances of the activated carbon of Examples and Comparative examples, first, each of the activated carbon was ground so as to obtain an average particle diameter of 5 to 20 µm. Next, a sugar liquid decolorization performance and a soy sauce decolorization performance of each of the activated carbon of Examples and Comparative examples were measured by the procedure mentioned below.

In addition, in order to evaluate a colorant decolorization performance, a colorant adsorption amount of each of the activated carbon of Examples and Comparative examples was measured by the procedure mentioned below. In this evaluation, the activated carbon before grinding was used.

These results are shown in Table 1.

<Sugar Liquid Decolorization Performance>

A raw sugar ("soft brown sugar" manufactured by Mitsui Sugar Co., Ltd.) (350 g) and 300 mL of ion-exchanged water were mixed at a normal temperature to dissolve the raw sugar. Next, a pH of this aqueous solution of the raw sugar was adjusted to 6.5 to 7.5 with an aqueous solution of sodium hydroxide or hydrochloric acid having a concentration of 0.1 mol/L, and it was confirmed by use of the sugar concentration meter ("Pocket sugar concentration meter PAL-2" manufactured by Atago Co., Ltd.) whether the sugar concentration was 50.0% to obtain a raw sugar liquid. In a case where the sugar concentration was not 50.0%, the raw sugar or ion-exchanged water was added to adjust the sugar concentration to 50.0%, and then, the obtained liquid was used as the raw sugar liquid. Subsequently, 300 g of a granulated sugar ("granulated sugar" manufactured by Mitsui Sugar Co., Ltd.) and 300 mL of ion-exchanged water were stirred at a normal temperature to dissolve the granulated sugar. A pH was adjusted and a sugar concentration was confirmed in the same manner as the raw sugar liquid, thereby a purified sugar liquid was obtained.

It was confirmed with a quartz cell (a light path length of 10 mm) by use of the ultraviolet-visible light spectrophotometer ("UV-1800" manufactured by Shimadzu Corporation) whether an absorbance at a wavelength of 420 nm of the raw sugar liquid was 0.75 to 0.78, and the raw sugar liquid was used as a sugar test liquid. Ion-exchanged water was used for zero point correction when the absorbance was measured. In a case where the measured absorbance value was higher than the above specified range (higher than 0.78), the purified sugar liquid was added to adjust the measured absorbance value to the above specified range, and the obtained liquid was used as a sugar test liquid. In contrast, in a case where the measured absorbance value was lower than the above specified range (lower than 0.75), the preparation was performed again by use of a raw sugar with another production lot, and the obtained liquid which had an absorbance falling within the above specified range was used as a sugar test liquid. A viscosity of the sugar test liquid at a temperature during a liquid phase treatment (50° C.) was 7 mPa·s.

A powdery activated carbon to be measured was dried at 115±5° C. for 3 hours, and allowed to cool in a desiccator. After cooling, 0.092 g of the powdery activated carbon was weighed, and put in a 100 mL conical flask with a stopper part. To this flask, 50 mL of the sugar test liquid was added, shaking was performed at a shaking amplitude of 140 times/minute for 1 hour in a water bath set at 50±1° C., filtering was performed with a 5C filter paper, the first 15 mL of the filtrate was discarded, and the subsequent filtrate was used as a sample solution. In addition, the above procedure was performed without any powdery activated carbon, and the obtained filtrate was used as a blank liquid. Absorbance values at wavelengths of 420 nm and 750 nm of each liquid were measured, and a sugar liquid decolorization performance was calculated by use of the following formula. The purified sugar liquid was used for zero point correction when the absorbance values were measured.

[Mathematical formula 3]

Sugar liquid decolorization performance [%]

$$= \left[ 1 - \frac{(\text{absorbance at 420 nm of sample liquid}) - (\text{absorbance at 750 nm of sample liquid})}{(\text{absorbance at 420 nm of blank liquid}) - (\text{absorbance at 750 nm of blank liquid})} \right] \times 100$$

The sugar liquid decolorization performance was evaluated according to the following criteria.

A: more than 50%
B: 40% or more, 50% or less
C: 30% or more, less than 40%
D: 20% or more, less than 30%
E: less than 20%

<Soy Sauce Decolorization Performance Measurement>

Soy sauce ("Specially selected whole soybean soy sauce" manufactured by Kikkoman Corporation) was diluted about 10 times with ion-exchanged water to adjust an absorbance at a wavelength of 550 nm to 0.47 to 0.55, and the obtained liquid was used as a soy sauce test liquid. A viscosity of the soy sauce test liquid at a temperature during a liquid phase treatment (25° C.) was 2 mPa·s. For an absorbance measurement, a quartz cell (a light path length of 10 mm) was used, and the ultraviolet-visible light spectrophotometer ("UV-1800" manufactured by Shimadzu Corporation) was used. Ion-exchanged water was used for zero point correction when the absorbance values were measured.

A powdery activated carbon to be measured was dried at 115±5° C. for 3 hours, and allowed to cool in a desiccator. After cooling, 0.20 g of the powdery activated carbon was weighed, and put in a 100 mL conical flask with a stopper part. To this flask, 40 mL of the soy sauce test liquid was added, shaking was performed at a shaking amplitude of 160 times/minute for 15 minutes in a water bath set at 25±1° C., filtering was performed with a 5C filter paper, the first 15 mL of the filtrate was discarded, and the subsequent filtrate was filtered again to use the obtained filtrate as a sample solution. In addition, the above procedure was performed without any powdery activated carbon, and the obtained filtrate was used as a blank liquid. An absorbance at a wavelength of 550 nm of each liquid was measured, and a soy sauce decolorization performance was calculated by use of the following formula. Ion-exchanged water was used for zero point correction when the absorbance values were measured.

[Mathematical formula 4]

Soy sauce decolorization performance [%]

$$= \left[ 1 - \frac{(\text{absorbance at 550 nm of sample liquid})}{(\text{absorbance at 550 nm of blank liquid})} \right] \times 100$$

The soy sauce decolorization performance was evaluated according to the following criteria.

A: more than 90%
B: 80% or more, 90% or less
C: 65% or more, less than 80%
D: 55% or more, less than 65%
E: less than 55%

<Colorant Adsorption Amount>

An aqueous solution of SPR having a concentration of 0.1% by mass was prepared by use of SPR and ion-exchanged water. A viscosity of the aqueous solution of SPR at a temperature during a liquid phase treatment (25° C.) was 2 mPa·s.

The aqueous solution of SPR (20 mL) was added to 0.2 g of activated carbon obtained by sizing with a 10 to 30 mesh sieve (JIS standard) and drying in order to obtain a sample, and two samples were prepared. These samples were shaken at a shaking amplitude of 160 times/minute in a water bath set at 25±1° C. One sample was filtered with Minisart (pore diameter: 0.45 μm) after shaking for 90 minutes, the other sample was filtered with Minisart (pore diameter: 0.45 μm) after shaking for 24 hours, and each filtrate was used as a measurement sample. In addition, the above procedure was performed without any activated carbon, and the obtained filtrate was used as a blank liquid. Each measurement sample and the blank liquid were diluted about 100 times with ion-exchanged water, and absorbance at a wavelength of 520 nm of each liquid was measured. For the absorbance measurements, a quartz cell (a light path length of 10 mm) was used, and the ultraviolet-visible light spectrophotometer ("UV-1800" manufactured by Shimadzu Corporation) was used. A colorant adsorption amount (a SPR adsorption amount) was obtained by use of the following formula. The SPR adsorption amount after shaking for 24 hours was used as a SPR equilibrium adsorption amount.

[Mathematical formula 5]

$$SPR \text{ adsorption amount [mg/g]} = \frac{\left\{ 20 \times \frac{0.1}{100} \times \left[ 1 - \frac{\text{(absorbance at 520 nm of sample liquid)}}{\text{(absorbance at 520 nm of blank liquid)}} \right] \times 1000 \right\}}{0.2}$$

In addition, from the SPR adsorption amount at a shaking time of 90 minutes and the SPR adsorption amount at a shaking time of 24 hours (the equilibrium adsorption amount), a SPR decolorization equilibrium arrival rate at a shaking time of 90 minutes was calculated by use of the following formula. The higher the decolorization equilibrium arrival rate is, the faster the adsorption rate is.

[Mathematical formula 6]

$$SPR \text{ decolorization equilibrium arrival rate [\%]} = \frac{SPR \text{ absorption amount (90 minutes)[mg/g]}}{SPR \text{ absorption amount (24 hours)[mg/g]}} \times 100$$

TABLE 1

| | Activation yield [%] | 10-10000 nm pore volume [mL/g] | 300-1000 nm pore volume [mL/g] | JIS hardness [%] | MS hardness [%] | Sugar liquid decolorization performance | Soy sauce decolorization performance | SPR equilibrium adsorption amount (24 hours) [mg/g] | SPR decolorization equilibrium arrival rate (90 minutes) [%] |
|---|---|---|---|---|---|---|---|---|---|
| Example 1 | 18.5 | 1.45 | 0.35 | 74.4 | 51.4 | A | A | 98.6 | 90.2 |
| Example 2 | 33.0 | 1.13 | 0.26 | 78.7 | 58.2 | A | A | 99.6 | 60.0 |
| Example 3 | 39.5 | 0.94 | 0.23 | 89.4 | 64.5 | B | B | 98.7 | 59.8 |
| Example 4 | 26.0 | 1.19 | 0.25 | 80.1 | 60.5 | B | A | 99.6 | 57.8 |
| Example 5 | 33.2 | 1.12 | 0.25 | 74.8 | 49.7 | B | A | 99.6 | 58.2 |
| Example 6 | 9.1 | 1.64 | 0.41 | 70.7 | 49.3 | A | A | 99.6 | 92.4 |
| Example 7 | 45.2 | 0.80 | 0.20 | 91.3 | 65.5 | B | B | 99.6 | 43.4 |
| Comparative example 1 | 50.0 | 0.36 | 0.12 | 96.0 | 32.0 | D | E | 25.3 | 40.2 |
| Comparative example 2 | 81.9 | 0.38 | 0.08 | 99.5 | 74.8 | D | E | 32.5 | 41.6 |
| Comparative example 3 | 59.5 | 0.73 | 0.19 | 94.6 | 68.9 | C | C | 91.5 | 37.6 |
| Comparative example 4 | 80.4 | 0.27 | 0.05 | 99.3 | 71.0 | E | E | 21.7 | 43.7 |
| Comparative example 5 | 57.0 | 0.45 | 0.08 | 95.5 | 67.4 | D | E | 63.9 | 29.4 |
| Comparative example 6 | 36.8 | 0.65 | 0.12 | 89.7 | 65.0 | D | E | 91.7 | 39.3 |
| Comparative example 7 | 30.4 | 0.72 | 0.13 | 82.8 | 64.2 | C | D | 97.1 | 51.4 |
| Comparative example 8 | 18.2 | 0.83 | 0.17 | 77.0 | 61.7 | C | C | 99.3 | 52.9 |
| Comparative example 9 | 13.3 | 0.27 | 0.01 | 97.0 | 76.4 | E | E | 48.4 | 50.9 |

As shown in Table 1, in cases where the activated carbon obtained in Examples 1 to 7 was used, high decolorization performances regarding the sugar liquid and soy sauce were exhibited. In contrast, in cases where the activated carbon obtained in Comparative example 1-9 was used, which had a low pore volume at a pore diameter of 10 to 10000 nm and/or 300 to 1000 nm, the sugar liquid decolorization performances and the soy sauce decolorization performances were extremely lower than those of Examples.

In addition, in cases where the activated carbon of the present invention obtained in Examples 1 to 7 was used, the SPR equilibrium adsorption amounts were high and the SPR decolorization equilibrium arrival rates in a short time of 90 minutes were high, which exhibit that the activated carbon of the present invention was excellent in the SPR adsorption amount and the SPR adsorption rate. In contrast, as to the activated carbon of Comparative examples 1, 2, 4, 5 and 9, the SPR equilibrium adsorption amounts were extremely lower than those of Examples, and the SPR decolorization equilibrium arrival rates were extremely lower than those of Examples. In addition, as to the activated carbon of Comparative examples 3 and 6, it was exhibited that the SPR equilibrium adsorption amounts were sufficient, but the SPR decolorization equilibrium arrival rates were lower than those of Examples, and that the adsorption rates were lower than those of Examples.

Furthermore, the activated carbon obtained in Examples 1 to 7 had the high JIS hardness of 70% or more and the high MS hardness of 45% or more, in addition to the excellent sugar liquid decolorization performances and the excellent soy sauce decolorization performances as well as the excellent SPR equilibrium adsorption amounts and the excellent SPR decolorization equilibrium arrival rates.

INDUSTRIAL APPLICABILITY

The activated carbon of the present invention is useful for liquid phase treatment applications, since it has the excellent decolorization performances and the excellent decolorization equilibrium arrival rates. In addition, it can be preferably used as activated carbon for treating various liquid phases, since it exhibits the high decolorization performances in a liquid phase having a relatively high viscosity such as the sugar liquid as well as a liquid phase having a low viscosity such as soy sauce. Furthermore, the activated carbon of the present invention having the high hardness can be preferably used for a liquid phase treatment requiring such hardness such as a treatment in an adsorption column or an adsorption tower. In addition, the activated carbon of the present invention can be produced by the simple method of changing a balance of amounts of the two metal elements and performing activation in the production process, which is industrially useful.

The invention claimed is:

1. An activated carbon, wherein the activated carbon has a pore volume at a pore diameter of 10 to 10000 nm measured by the mercury intrusion method of 0.8 to 1.7 mL/g, and a pore volume at a pore diameter of 300 to 1000 nm measured by the mercury intrusion method of 0.25 to 0.41 mL/g.

2. The activated carbon according to claim I, wherein a raw material of the activated carbon is activated carbon derived from coconut shell.

3. The activated carbon according to claim 1, wherein the activated carbon is activated carbon for a liquid phase treatment.

4. The activated carbon according to claim 3, wherein the liquid phase treatment is a treatment for removing a coloring component from a liquid phase.

5. The activated carbon according to claim 3, wherein a viscosity of a liquid phase measured at a temperature during the liquid phase treatment by use of DV-I+VISCOMETER manufactured by BROOKFIELD (spindle: LV-1, rotational speed: 20 rpm) is 1 to 50 mPa·s.

6. The activated carbon according to claim 1, wherein the activated carbon has micro-strength hardness of 45% or more.

7. The activated carbon according to claim 1, wherein the activated carbon has a pore volume at a pore diameter of 10 to 10000 nm measured by the mercury intrusion method of 1.0 to 1.6 mL/g, and a pore volume at a pore diameter of 300 to 1000 nm measured by the mercury intrusion method of 0.25 to 0.40 mL/g.

8. The activated carbon according to claim 1, wherein the activated carbon has a pore volume at a pore diameter of 10 to 10000 nm measured by the mercury intrusion method of 1.3 to 1.5 mL/g, and a pore volume at a pore diameter of 300 to 1000 nm measured by the mercury intrusion method of 0.30 to 0.38 mL/g.

9. The activated carbon according to claim 1, wherein the activated carbon has a pore volume at a pore diameter of 10 to 10000 nm measured by the mercury intrusion method of 1.3 to 1.5 mL/g, and a pore volume at a pore diameter of 300 to 1000 nm measured by the mercury intrusion method of 0.30 to 0.37 mL/g.

10. A method for producing the activated carbon of claim 1, the method comprising:
   (i) adjusting a potassium element content of a raw material activated carbon to 0.5% by mass or less;
   (ii) adjusting a calcium element content of the raw material activated carbon to 0.4 to 4% by mass; and
   (iii) activating the raw material activated carbon after performing the adjusting (i) and (ii).

* * * * *